United States Patent [19]

Willis

[11] Patent Number: 4,892,156

[45] Date of Patent: Jan. 9, 1990

[54] GARDEN TOOL

[76] Inventor: Walter C. Willis, Rte. 2 Box 255, Louisburg, N.C. 27549

[21] Appl. No.: 304,419

[22] Filed: Jan. 31, 1989

[51] Int. Cl.⁴ .............................................. A01B 1/06
[52] U.S. Cl. .................................... 172/381; 172/378
[58] Field of Search ............... 172/378, 381, 376, 377, 172/374, 371, 380

[56] References Cited

U.S. PATENT DOCUMENTS

| | | | |
|---|---|---|---|
| 112,527 | 3/1871 | Avery | 172/381 |
| 1,202,791 | 10/1916 | Brownstein | 172/375 |
| 1,239,316 | 9/1917 | Svendsen | 172/376 |
| 2,076,120 | 4/1937 | Cyganick | 172/380 |
| 2,085,382 | 6/1937 | Neber | 294/545 |
| 2,331,414 | 10/1943 | Morris | 172/375 |
| 2,536,180 | 1/1951 | Hines | 172/375 X |
| 2,945,543 | 7/1960 | Beyer | 172/380 X |
| 4,411,320 | 10/1983 | Hiss | 172/13 |

Primary Examiner—Richard J. Johnson
Attorney, Agent, or Firm—Jerry T. Kearns

[57] ABSTRACT

A garden tool for cultivating and tilling garden soil has a cultivating blade secured at one end of an elongated handle. The cultivating blade is formed by a plurality of sequential adjacent connected teeth, each formed by a pair of perpendicular facets intersecting at a ridge line. The leading edge of each of the facets is grounded to a sharpened cutting edge. In use, the cultivating blade is pushed forward and downward into the surface of the soil and subsequently pulled back. This reciprocating movement is repeated and tills the ground in a shaving or plowing action.

14 Claims, 5 Drawing Sheets

GARDEN TOOL

BACKGROUND OF THE INVENTION

1. Field of the Invention

The present invention relates to garden tools, and more particularly pertains to a garden tool designed for manually cultivating and tilling garden soil. Various types of manual and motorized devices have been developed for tilling the soil. The manual devices frequently require a great deal of effort to use and are of only limited effectiveness. The motorized devices such as roto-tillers are expensive and somewhat dangerous to operate. The manual tools developed in the prior art require a swinging or chopping motion in order to break the surface of the soil. The present invention overcomes this problem by providing a simple inexpensive manual tool having a specially configured sharpened cutting edge for plowing or shaving the ground in an easily performed reciprocating motion.

2. Description of the Prior Art

Various types of garden tools are known in the prior art. A typical example of such a garden tool is to be found in U.S. Pat. No. 1,239,316, which issued to S. Svendsen on Sept. 4, 1917. This patent a weeding tool having a cutting blade secured adjacent one end of an elongated handle. The cutting blade is formed by a plurality of adjacent triangular shear blades lying in a common plane. U.S. Pat. No. 2,085,382, which issued to W. Nebor on June 29, 1937, discloses a snow shovel having a corrugated sinusoidal blade. U.S. Pat. No. 2,331,414, which issued to J. Morres on Oct. 12, 1943, discloses a garden tool having a cutting blade secured adjacent one end of an elongated handle. The cutting blade includes a plurality of triangular adjacent teeth extending in a common plane lying generally transverse to the longitudinal axis of the handle. U.S. Pat. No. 2,945,543, which issued to F. Beyer on July 19, 1960, discloses a garden tool having a pivotal U-shaped cutting blade secured at one end of an elongated handle. The U-shaped cutting blade includes a plurality of sequential adjacent perpendicular intersecting facets. The ridge lines formed by the intersecting facets extend generally transverse to the longitudinal axis of the handle. U.S. Pat. No. 4,411,320, which issued to R. Hiss on Oct. 25, 1983, discloses an edging tool having a planar cutting blade secured adjacent one end of an elongated handle. The cutting blade has a leading edge provided with a plurality of scalloped-type serrations formed by co-planar edges intersecting at a 90 degree angle.

While the above mentioned devices are suited for their intended usage, none of these devices are capable of tilling garden soil to a significant depth utilizing an efficient plowing or shaving reciprocating motion. Additionally, none of the aforesaid devices disclose the novel cutting blade configuration of the present invention which utilizes a blade formed by a plurality of adjacent teeth each formed by a pair of perpendicular facets intersecting at a ridge line extending generally parallel to the longitudinal axis of an attached handle. Inasmuch as the art is relatively crowded with respect to these various types of garden tools, it can be appreciated that there is a continuing need for and interest in improvements to such garden tools, and in this respect, the present invention addresses this need and interest.

SUMMARY OF THE INVENTION

In view of the foregoing disadvantages inherent in the known types of garden tools now present in the prior art, the present invention provides an improved garden tool. As such, the general purpose of the present invention, which will be described subsequently in greater detail, is to provide a new and improved garden tool which has all the advantages of the prior art garden tools and none of the disadvantages.

To attain this, representative embodiments of the concepts of the present invention are illustrated in the drawings and make use of a garden tool for cultivating and tilling garden soil including a cultivating blade secured at one end of an elongated handle. The cultivating blade is formed by a plurality of sequential adjacent connected teeth, each formed by a pair of perpendicular facets intersecting at a ridge line. The leading edge of each the facets is ground to a sharpened cutting edge. In use, the cultivating blade is pushed forward and downward into the surface of the soil and subsequently pulled back. This reciprocating movement is repeated and tills the ground in a shaving or plowing action.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved garden tool which has all the advantages of the prior art garden tools and none of the disadvantages.

It is another object of the present invention to provide a new and improved garden tool which may be easily and efficiently manufactured and marketed.

It is a further object of the present invention to provide a new and improved garden tool which is of a durable and reliable construction.

An even further object of the present invention is to provide a new and improved garden tool which is susceptible of a low cost of manufacture with regard to both materials and labor, and which accordingly is then susceptible of low prices of sale to the consuming public, thereby making such garden tools economically available to the buying public.

Still yet another object of the present invention is to provide a new and improved garden tool which provides in the apparatuses and methods of the prior art some of the advantages thereof, while simultaneously overcoming some of the disadvantages normally associated therewith.

Still another object of the present invention is to provide a new and improved garden tool for efficiently manually tilling soil to a significant depth with a minimum of exertion.

Yet another object of the present invention is to provide a new and improved garden tool having a sharpened leading cutting edge formed by a plurality of sequential adjacent teeth each having a pair of perpendicular intersecting facets intersecting at a ridge line to till the soil in a reciprocating plowing or shaving action.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
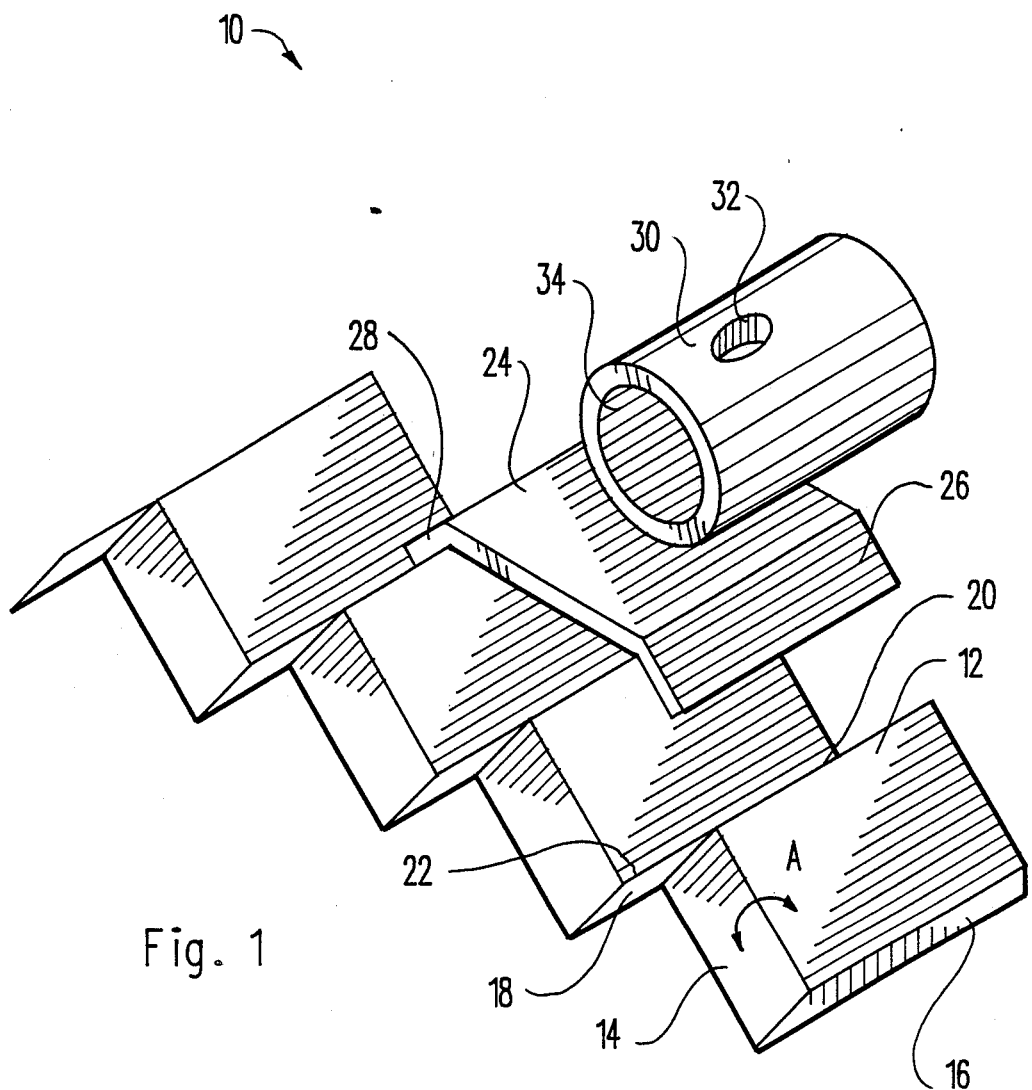
FIG. 1 is a perspective view illustrating the cutting blade of the garden tool according to the first embodiment of the present invention.

With reference now to the drawings, and in particular to FIG. 1 thereof, a new and improved garden tool embodying the principles and concepts of the present invention and generally designated by the reference numeral 10 will be described.

More specifically, it will be noted that the first embodiment 10 of the invention includes a cutting blade having a generally saw toothed wave configuration. The cutting blade is formed by a plurality of sequential adjacent connected teeth, each formed by a pair of perpendicular facets intersecting at a ridge line. For example, the facet 12 intersects with the adjacent facet at a ridge line 20. While the illustrated cutting blade is formed by four adjacent cutting teeth, it should be understood that a greater or lesser number may be provided, without departing from the scope of the present invention. The leading edge of each of the rectangular facets, for example 14 and 18, is sharpened to provide a cutting edge for shaving or plowing the soil. Each of the cutting edges 14 and 18 is preferably ground at an angle A of about thirty degrees with respect to the planar upper surface of the facet 12. The side edge of the two outer facets 16 forms a right angle with respect to the upper surface of the facet 12. A cylindrical socket 30 is welded to a mounting plate 24 which spans the ridge lines of two central adjacent teeth. Angular flanges 26 and 28 may be provided on the mounting plate 24 to overlie the supporting inclined facets. The plate 24, socket 30 and the entire cutting blade is preferably formed from a hardened steel. The various components may be assembled by welding. The saw toothed cutting blade portion is preferably formed from an eleven gauge HR steel plate twelve inches long by four inches wide. The steel plate is ground along one long edge at a thirty degree angle to produce the leading cutting edges 14 and 18. The plate is then stamped to produce a corrugated surface that will result in four one inch high angular peaks, each four inches in length. After the stamping operation, the blade will be about eight inches long and four inches wide. The mounting plate 24 is preferably formed from an eleven gauge HR steel plate two inches by four inches, and is welded in place. The socket 30 is preferably formed from a one and one fourth inch diameter by fourteen gauge wall steel tubing four inches in length.

Figure 2:
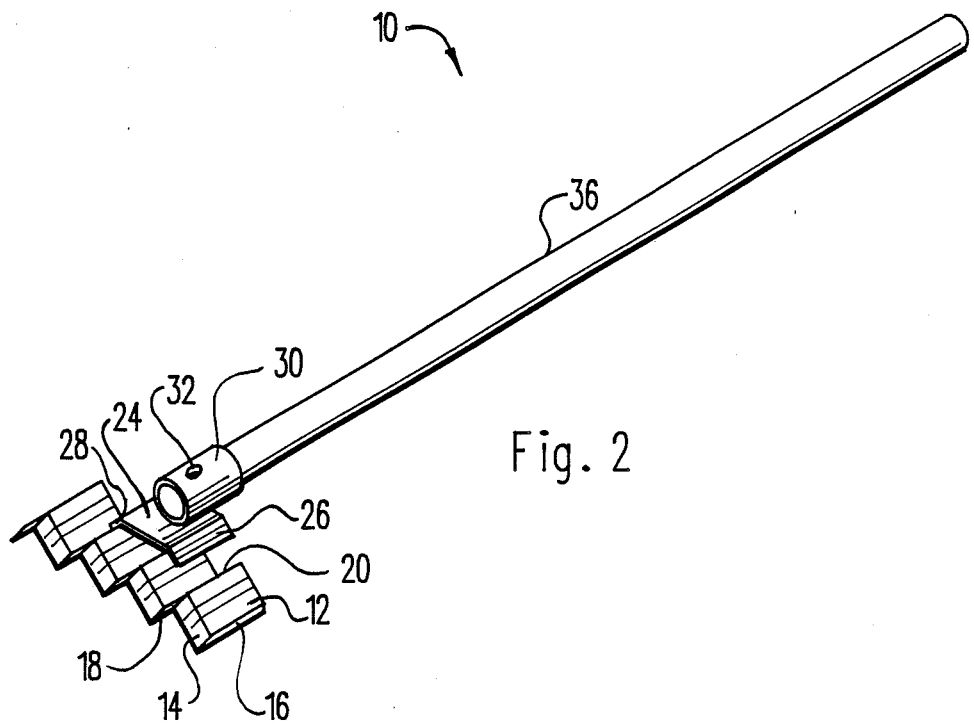
FIG. 2 is a perspective view illustrating the garden tool according to the first embodiment of the present invention.

As shown in FIG. 2, an elongated wooden handle 36 is mounted in the socket 30 through the use of a suitable fastener extending through the aperture 32 of the socket 30. In use, the handle 36 is oriented at an acute angle with the horizontal surface of the ground and is pushed forward and downward. After the cutting blade portion has penetrated the earth to the desired depth, the handle 36 is pulled backwards, without application of downward pressure. This operation is repeated until the desired area is worked. The tilling depth may be varied by regulating the pressure exerted on the handle 36. The blade will penetrate the ground as deep as eight inches, or it may also be utilized to cultivate an established garden at only one half inch to one inch in depth. The motion required to use the tool is a simple reciprocating linear motion. This contrasts with the chopping motion required with conventional prior art devices. The sharpened cutting edges 14 and 18 of the cutting blade shave the ground in a plowing action. Additionally, an individual may retreat rearwardly while utilizing the tool 10 of the present invention, thus avoiding the necessity of having to step in and compact previously tilled soil. A conventional motorized roto-tiller requires that the individual walk in the freshly plowed soil, thus packing it down. The tool 10 of the present invention functions effectively in hard packed clay and additionally is effective to remove stones from rocky soil.

Figure 3:
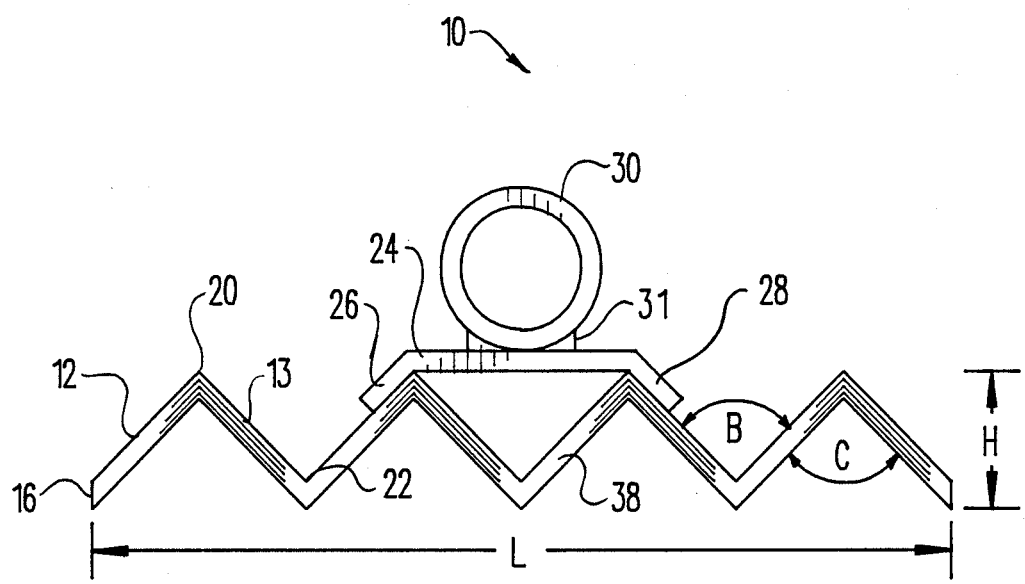
FIG. 3 is a back end view illustrating the cutting blade portion of the garden tool of the first embodiment of the present invention.

FIG. 3 illustrates a back end view of the cutting blade portion of the garden tool 10. The trailing edge 38 of each of the four cutting teeth is a planar surface. The length L of the cutting blade is preferably about eight inches and the height H of the saw toothed peaks of each tooth is preferably about one inch. Each of the intersecting facets form included angles B and C of ninety degrees with each adjacent facet. The cutting blade has a generally saw toothed configuration formed by a series of adjacent intersecting facets 12 and 13, which intersect at a ridge line 20. In the illustrated embodiment 10, the ridge lines 20 extends generally parallel to the longitudinal axis of the cylindrical socket 30 and are disposed at a common elevation.

Figure 4:
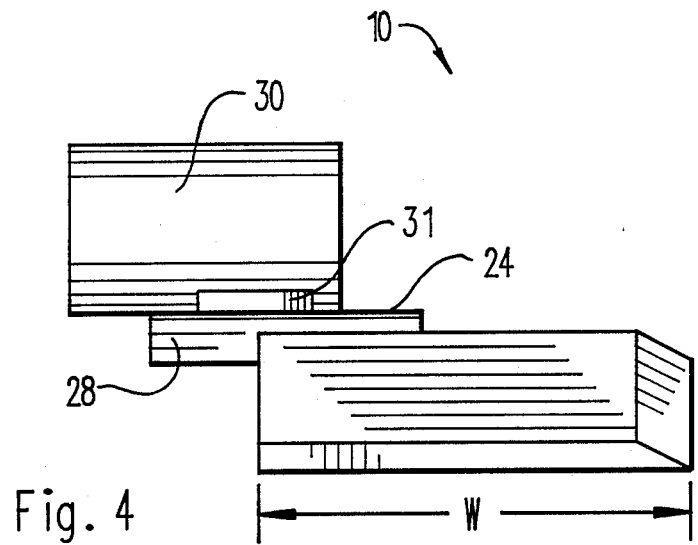
FIG. 4 is a side view of the cutting blade of the garden tool according to the first embodiment of the present invention.

FIG. 4 illustrates a side view of the cutting blade portion of the tool 10. The socket 30 is preferably secured by a weld 31 to the upper surface of the mounting plate 24. The width W of the cutting blade portion is preferably four inches.

Figure 5:
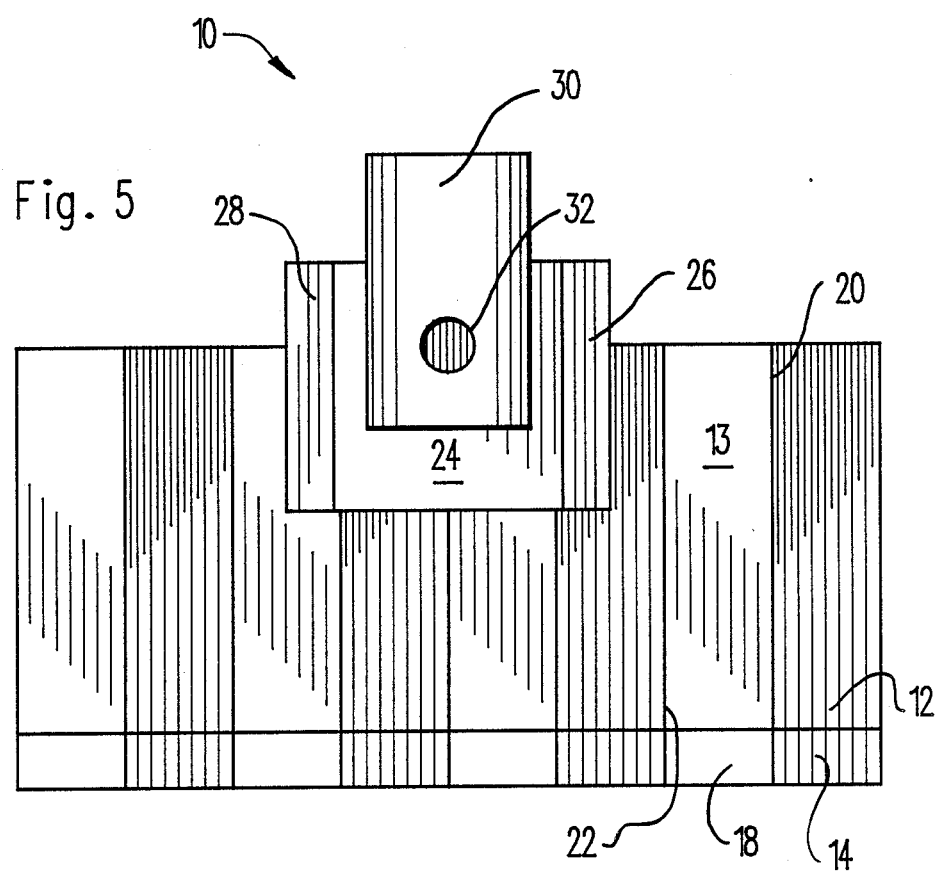
FIG. 5 is a top view of the cutting blade of the garden tool according to the first embodiment of the present invention.

FIG. 5 illustrates a top view of the cutting blade portion of the tool 10 of the present invention.

Figure 6:
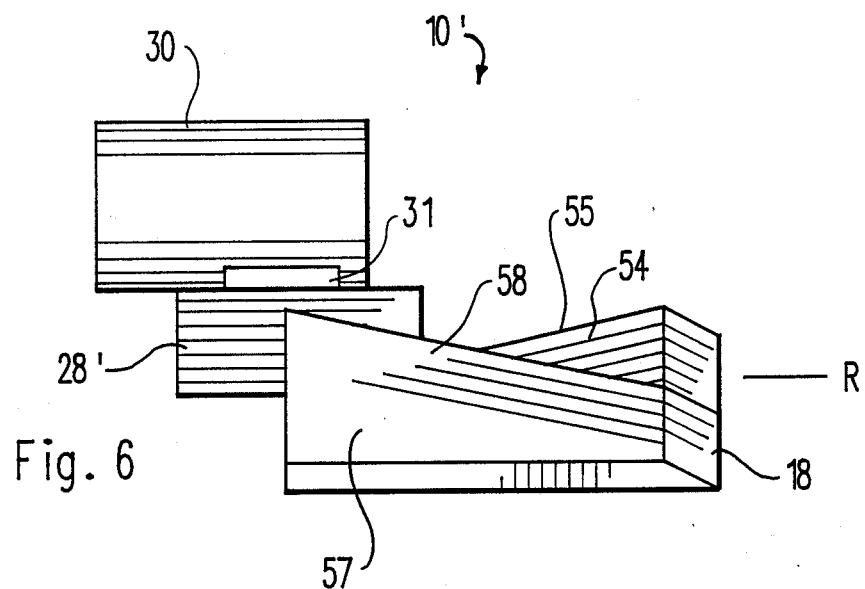
FIG. 6 is a side view illustrating a garden tool according to a slightly modified second embodiment of the present invention.

FIG. 6 illustrates the cutting blade portion of a modified embodiment 10' of the garden tool of the present invention. The ridge line 58 of every other tooth tapers in elevation from the leading edge to the trailing edge. The ridge lines 55 of the remaining alternate teeth tapers in elevation from the leading edge to the trailing edge in an opposite direction. Thus, the elevation of the ridge line 58 is at a reference level R adjacent the leading edge 18 and the apex line 55 of the adjacent tooth tapers to the reference level R adjacent the trailing edge of the tooth.

Figure 7:
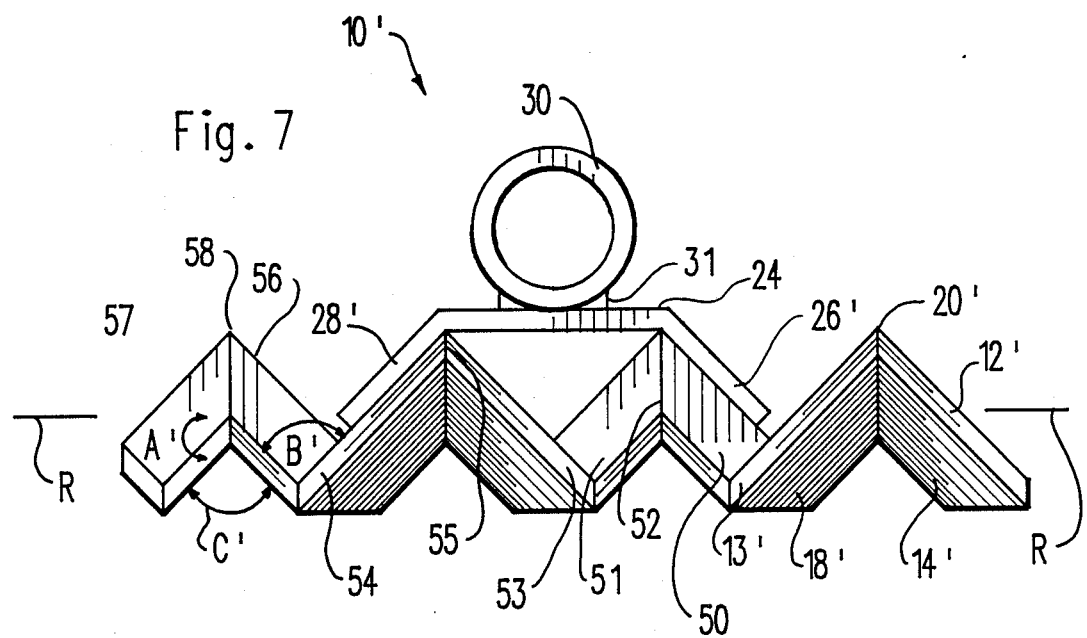
FIG. 7 is a front end view of the cutting blade of a garden tool according to the second embodiment of the present invention.

FIG. 7 illustrates a front end view of the cutting blade portion of the tool 10'. The facets 57 and 56 intersect perpendicularly at the apex line 58. Instead of being rectangular as in the first embodiment 10, the facets 57 and 56, as well as the facets forming each of the other teeth, are mirror symmetrical halves of a trapezoid. The ridge line 58 lies in the mirror plane. The angles C' and B' between each pair of adjacent facets is 90 degrees. The reference elevation R is the elevation of the ridge line 58 and 52 adjacent the sharpened leading edge of the tool. The reference elevation R also indicates the elevation of the ridge lines 55 and 20' adjacent the trailing edge of the cutting blade. The facets 57 and 56 taper in width from a wide end adjacent the trailing edge of the tooth to a narrow end adjacent the leading edge of the tooth. The facets 51 and 50 intersecting at the apex line 52 are identically formed as facets 57 and 56. The facets 53 and 54 intersect at a ridge line 55 and taper in width from a wide end adjacent the leading edge of the tooth to a narrow end adjacent the trailing end of the tooth. The facets 13' and 12' intersecting at the ridge line 20' are formed identically as facets 54 and 53.

Figure 8:
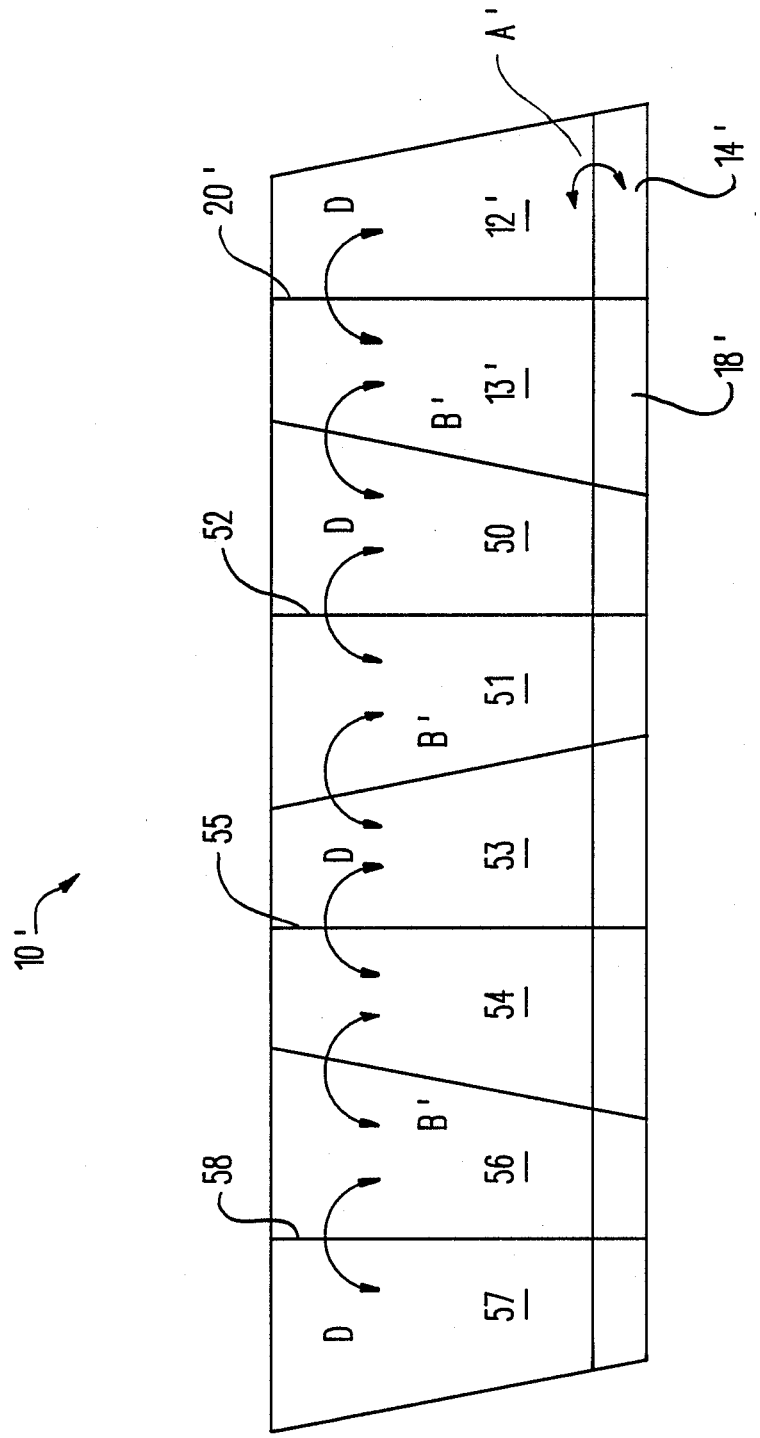
FIG. 8 is a diagrammatic top view illustrating the cutting blade of the garden tool according to the second embodiment of the present invention.

FIG. 8 provides a diagrammatic top plan view of the cutting blade portion of the modified embodiment 10'. The included angle D between the pair of facets forming each tooth is two hundred seventy degrees. The included angle B' between adjacent facets of adjacent teeth is ninety degrees. As clearly shown, the pair of facets, for example 56 and 57, forming any of the teeth are mirror symmetrical halves of a trapezoid subdivided by the apex line 58. The angle A' of the sharpened leading edges 14' and 18' of each tooth is preferably about thirty degrees. This configuration provides a greater variation in the elevation of the cutting edge between adjacent teeth, thus enhancing the tilling action. Additionally, because of the tapering width of the facets, the tilled soil is directed laterally as it passes across the upper and lower surfaces of each facet, thus further breaking the soil.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A garden tool, comprising:
an elongated handle;
means fixedly securing a cultivating blade adjacent one end of said handle;
said blade having a plurality of sequential adjacent connected teeth;
each of said teeth formed by a pair of generally perpendicular facets intersecting at a ridge line;
each of said pairs of facets forming each of said teeth being mirror symmetrical halves of a trapezoid;
each of said ridge lines extending generally parallel with said elongated handle;
and
a sharpened leading edge provided on each of said facets.

2. The garden tool of claim 1, wherein facets of each pair of adjacent teeth taper in width in opposite directions.

3. The garden tool of claim 1, wherein said cultivating blade is formed from steel.

4. The garden tool of claim 1, wherein said cultivating blade has four teeth.

5. The garden tool of claim 1, wherein the ridge line of each tooth tapers in elevation from a leading edge to a trailing edge.

6. The garden tool of claim 5, wherein the ridge lines of each pair of adjacent teeth taper in elevation in opposite directions.

7. A garden tool, comprising:
a cultivating blade;
said blade having a plurality of sequential adjacent connected teeth;
each of said teeth formed by a pair of generally perpendicular facets intersecting at a ridge line;
each of said ridge lines extending generally parallel with said elongated handle;
a sharpened leading edge provided on each of said facets;

a cylindrical socket secured to an upper surface of a mounting plate spanning ridge lines of a central pair of adjacent teeth;
and
an elongated handle secured in said socket.

8. The garden tool of claim 7, wherein said cultivating blade is formed from steel.

9. The garden tool of claim 7, wherein said cultivating blade has four teeth.

10. The garden tool of claim 7, wherein each of said facets are rectangular.

11. The garden tool of claim 7, wherein each pair of facets forming each of said teeth are mirror symmetrical halves of a trapezoid.

12. The garden tool of claim 11, wherein facets of each pair of adjacent teeth taper in width in opposite directions.

13. The garden tool of claim 11, wherein the ridge line of each tooth tapers in elevation from a leading edge to a trailing edge.

14. The garden tool of claim 13, wherein the ridge lines of each pair of adjacent teeth taper in elevation in opposite directions.

* * * * *